(12) United States Patent
Mitsch

(10) Patent No.: US 9,194,450 B2
(45) Date of Patent: Nov. 24, 2015

(54) ELASTOMER COMPONENTS THAT CAN BE PRE-STRESSED BY PRESSURE MEANS, AND METHOD FOR THE PRODUCTION THEREOF

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

( * ) Notice: Subject to any disclaimer, the term of this patent is extended or adjusted under 35 U.S.C. 154(b) by 0 days.

(21) Appl. No.: 14/637,504

(22) Filed: Mar. 4, 2015

(65) Prior Publication Data
US 2015/0176671 A1    Jun. 25, 2015

Related U.S. Application Data

(62) Division of application No. 12/935,010, filed as application No. PCT/EP2009/002320 on Mar. 31, 2009, now Pat. No. 8,998,188.

(30) Foreign Application Priority Data

Apr. 3, 2008   (EP) .................................... 08006773

(51) Int. Cl.
*F16F 7/00*    (2006.01)
*F16F 1/36*    (2006.01)
*F03D 11/04*   (2006.01)
*F16F 1/44*    (2006.01)

(52) U.S. Cl.
CPC .............. *F16F 1/3615* (2013.01); *F03D 11/04* (2013.01); *F16F 1/44* (2013.01); *F16F 2228/08* (2013.01); *Y02E 10/728* (2013.01)

(58) Field of Classification Search
CPC ........... F16F 1/3615; F16F 1/36; F16F 1/371; F16F 1/42; F16F 1/44; F16F 1/445; F16F 2228/08; F16F 2236/04; F16F 2236/045; F16F 2236/00
USPC ............. 267/35, 292, 294, 140.2, 140.4, 141, 267/141.1, 141.2; 248/621, 631
See application file for complete search history.

(56) References Cited

U.S. PATENT DOCUMENTS 5,833,038 A    11/1998   Sheiba

FOREIGN PATENT DOCUMENTS

| EP | 1 046 832 A1 | 10/2000 |
| EP | 1 566 543 A1 | 8/2005 |
| EP | 1 887 248 A1 | 8/2007 |

*Primary Examiner* — Robert A Siconolfi
*Assistant Examiner* — Vu Q Nguyen
(74) *Attorney, Agent, or Firm* — Davis & Bujold, P.L.L.C.; Michael J. Bujold

(57) ABSTRACT

Elastomer components, which are to have an elastomer volume with a sufficiently large prestress, as is required, for example, for use in wind energy plants. The elastomer components are substantially based on the incorporation and integration of separating elements into the elastomer body of the component, the elements are disposed either individually or in structures. The body may be compressed by pressure supplied into the region, between the separating elements and the surrounding elastomer material, or directly into the separating elements, such that the elastomer components are prestressed in a dynamically adjustable manner.

20 Claims, 10 Drawing Sheets

107

108

108

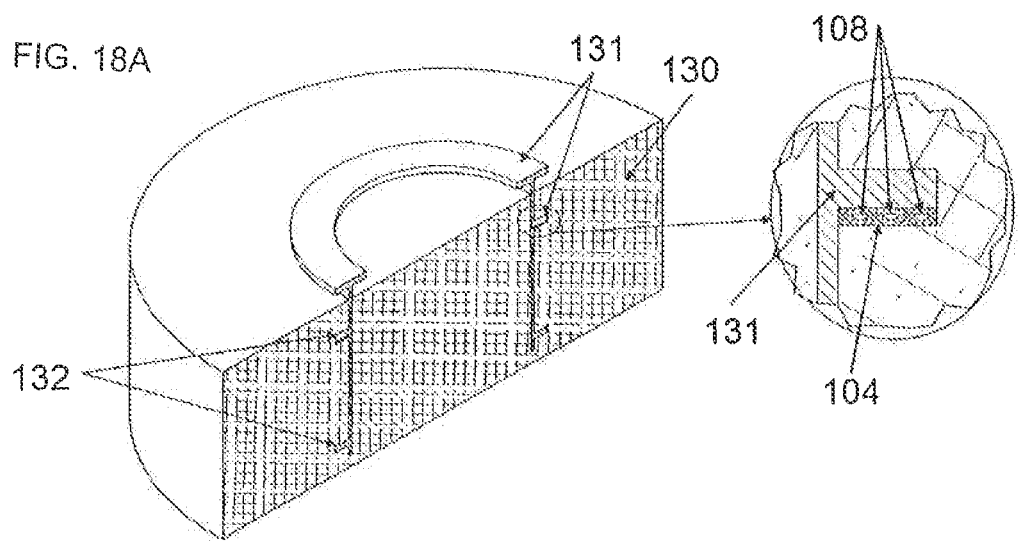

ELASTOMER COMPONENTS THAT CAN BE PRE-STRESSED BY PRESSURE MEANS, AND METHOD FOR THE PRODUCTION THEREOF

This application is a divisional of U.S. patent application Ser. No. 12/935,010 filed Sep. 28, 2010, which is a National Stage completion of PCT/EP2009/002320 filed Mar. 31, 2009, which claims priority from European patent application serial no. 08006773 filed Apr. 3, 2008.

FIELD OF THE INVENTION

The invention relates to elastomer components, in particular elastomer bushes or elastomeric layer springs, which can be pre-stressed in a novel manner, to the use thereof, and to a process for the production thereof. In particular, the invention relates to large elastomer components which are intended or required to have a large elastomer volume with sufficiently large pre-stress, as is necessary, for example, for use in wind turbines. The elastomer components according to the invention are essentially based here on the introduction and integration of separating elements, arranged individually or in structures, into the elastomer body of the component, which can be compressed and thus pre-stressed by pressure media introduced into the region between separating means and surrounding elastomer material, or into the separating elements themselves. On use of hydraulic fluids or gases, variably adjustable pre-stress of the elastomer component can thus be achieved, while on use of a polymerizable liquid, a fixed pre-stress is possible.

BACKGROUND OF THE INVENTION

Elastomers have the property that the service life of the material is very limited, in particular in the case of the permanent presence or occurrence of tensile stresses. In the design and production of components which comprise elastomers for damping purposes, great care is therefore taken to ensure that tensile stresses cannot occur.

For this reason, elastomer components, e.g. elastomer bushes for wind turbines, are, in accordance with the prior art, pre-stressed after vulcanization of the rubber material. This is generally carried out by calibration.

In the simplest case, an elastomer bush consists of an outer and inner shell, generally made from metal, usually with a round or elliptical shape, where the two shells are connected to one another by an elastomer layer of various thickness. The elastomer bush forms a type of collar, which is placed with its inner shell around the article to be damped (e.g. a shaft or axle of a machine or device to be damped). During calibration, either the outer shell is forced through a tube of relatively small diameter and plastically deformed in the process. This causes the diameter of the outer shell to become smaller, so that pre-stressing of the elastomer located between the outer and inner shell takes place. Conversely, a pre-stress can be generated by forcing a bolt of larger diameter than the inner shell through the latter, which results in expansion of the inner shell towards the outside and thus compression of the elastomer layer between the outer and inner shell.

These two processes can be carried out individually or also together. If the elastomer layer is compressed by the calibration, it is thus pre-stressed in the pressure direction. In the case of radial deformation of the outer shell towards the inner shell, the operation is carried out in this pressure range, meaning that tensile stresses do not occur in the elastomer layer and the service life of the components is assured.

The situation is similar with other elastomer elements, such as layer springs or other bearings or damping means, in which a fairly large elastomer layer has to be compressed to a not inconsiderable extent and thus pre-stressed.

However, the known prior-art process described above can only be achieved at acceptable cost with bushes and bearings having relatively small dimensions (diameter less than 30 cm). The forces that have to be applied in order to pre-stress, or calibrate, relatively large bushes (diameter greater than 30 cm, preferably greater than 100 cm) are on the one hand too great, and on the other hand the terminal or limiting elements or plates would in these cases have to be dimensioned corresponding to their thickness and manufactured from very sturdy material in order that they do not bend up again or deform due to the large internal pressure of the elastomer which has arisen owing to the calibration carried out. Similar problems can be expected in arrangements which are intended to comprise particular materials or have particular shapes and thus cannot be calibrated or can only be calibrated to a limited extent by the known prior-art methods.

SUMMARY OF THE INVENTION

The object was thus to provide elastomeric, pre-stressable components serving as bearings, in particular bushes, preferably bushes for wind turbines, and processes for the production thereof and methods for the calibration thereof.

It has been found that elastomer components which have a separating element of corresponding dimensions, preferably in their interior, can be compressed particularly advantageously and effectively if the region either in the separating elements themselves or alternatively preferably around the separating elements is supplied with liquid, gaseous or polymerizing media under pressure via a supply line. The separating element here can be designed in such a way that it is expanded by the ingressing pressure medium. In the preferred embodiment of the invention, the separating elements are conceived in such a way that the ingress of pressure medium causes the formation of chambers and cavities between separating element and adjacent elastomer layer, which have the effect that the elastomer layer compresses specifically with a large volume, restricted to certain parts of the elastomer component, in a locally different manner or uniformly and thus pre-stresses, in accordance with the selected properties of the separating element and of the elastomer material.

This novel principle of elastomer compression and the use thereof is highly variable with respect to the type and effectiveness of the separating elements and also the pressure media which can be employed, which generally enable pre-stressing of the elastomer part which can be adjusted in a fixed or variable to dynamic manner. The elastomeric components, for example bushes or layer springs, can thus be calibrated extremely well, optionally in a variable manner, over a broad range in relation to the pre-stress, which thus represents a further advantage over the prior-art elastomer parts relating to this, and the production thereof.

In the preferred embodiment, the separating elements of the novel elastomer components comprise materials which actually only serve to provide regions and zones of different size and structure in the elastomer layer in which the elastomer material is not present throughout, but instead is interrupted by the separating elements so that the elastomeric areas of the surrounding elastomer material lie against the separating element in these regions in the pressure-free state and are lifted off the separating element in this region on introduction of a pressure medium via a supply line, i.e. under pressure, resulting in the formation of cavities or chambers.

The elastomer layer can thus be compressed or pre-stressed further. The supply of the pressure medium here is continued until the desired pre-stress has been achieved in the elastomer part or the relevant part of the elastomer.

In order to produce the chambers and cavities, the separating elements are introduced into the not yet solid, viscous rubber or polymer material in various ways during production of the elastomer layer. It is crucial here that the separating elements do not form a strong chemical bond to the still-soft, not yet fully cured elastomer material in this process. Only in this way can the cavities or interfaces mentioned form in accordance with the structure and geometry of the separating elements after curing of the elastomer material.

In another, alternative embodiment of the invention, the separating element does not serve as surface or interface to the surrounding area of the elastomer material between which the pressure medium ingresses, but instead is conceived as an elastic hollow body. In this case, the pressure medium is not fed between separating element and elastomer layer, but instead into the hollow body itself. In the simplest case, the hollow body is an elastic tube or a cavity of any desired shape which is surrounded by an elastic wall. In the pressure-free state, the hollow body can be entirely or partially squashed by the elastomer layer surrounding it. The hollow body may also have in part solid structural elements which prevents complete squashing in the pressure-free state by the adjacent elastomer layers. This may be necessary if, for example, a large displacement volume by the pressure medium is desired. In principle, it is not necessary in this embodiment for the elastic wall of the hollow body not to form a chemical bond to the surrounding material, since the pressure medium is forced into the interior of the hollow body and not into the interfacial region.

The invention thus relates to a pre-stressable elastomer component comprising at least one elastomer layer and at least one pressure-resistant supply line, preferably having a valve, where the elastomer layer (3, 104) has, in the interior or on an interface, regions having one or more separating elements (4, 105, 107, 115, 116), so that, on the feed of pressure media (5) via the supply line with valve (10, 101), cavities or chambers (106, 108, 114) form in the region of the separating elements (105, 107, 115, 116) or in the separating elements themselves (4) due to the surrounding elastomer layer being forced apart, where the cavities or chambers can be filled with the pressure medium (5) and expanded, causing the surrounding elastomer layer (3, 104) to be squashed, and the elastomer part to be provided with a pre-stress.

In the alternative embodiment of the invention, the separating element (107) is a deformable hollow body (4) having an elastic outer wall, for example an elastic tube, which can be filled with pressure medium (5) via the supply line (10, 101) and expanded.

In the preferred embodiment of the invention, the separating element (105, 107, 115, 116) lies against the surrounding elastomer layer or is surrounded thereby without being firmly connected thereto, and cavities or chambers (106, 108, 114) form around the separating elements due to the introduction of the pressure medium (5) into this interfacial region. In these cases, the separating element can be a wire, a hollow wire, a filament, a film, a plate, a paper, a paint, lacquer or varnish layer made from a very wide variety of materials, which, itself or where appropriate its coating, as mentioned, must not form a chemical bond to the elastomer material during production thereof.

The thickness of the wire, hollow wire, film, plate, paint, lacquer or varnish layer can be very thin (<1 mm, <0.5 mm, <0.1 mm), which has the advantage that the separating elements have virtually no significant volume and/or weight of their own. On use of a hollow wire or cannula, a heating device may be provided, for example, in the interior, by means of which the elastomeric properties of the elastomer part can be additionally influenced.

The wire may also be dimensioned in cross section in such a way that it heats up due to its own resistance when a current flows through it.

A further possibility for heating the wire or another inlaid metal body is induction. This enables local or also complete warming of the inlaid component.

The separating elements (4, 105, 107, 115) may, in accordance with the invention, be installed in a linear, two-dimensional or also three-dimensional manner (116) in the elastomer body of the component. Entire structures of a wide variety of sizes, distributions and arrangements can thus be formed. For example, a wire or tube can be guided in a ring-shaped, spiral-shaped, meander-shaped or irregular manner, depending on which regions in the elastomer part are to be pre-stressed to a greater or lesser extent. For example, one layer can be in the form of rectangular or round areas, which may be connected to one another by channels (115). Layers of this type may be generated, e.g., in color printing processes, or provided as prefabricated metal blank or template. The separating elements, or individual structures of these separating elements, may, depending on the technical requirement, be uniformly distributed in the elastomer component or alternatively arranged in a locally concentrated manner, where, if appropriate, these structures can be subjected to different pressures in individual segments or regions of the elastomer component through a plurality of correspondingly arranged supply lines (10, 101).

Variability of this type in optionally locally different structures of separating elements ultimately enables the installation of a likewise locally very different, very specific matched individual pre-stress in selected regions of the elastomer component according to the invention. The variability in the pre-stresses to be achieved may additionally also be increased through the use of elastomeric materials having different stiffness and/or varying coefficients of expansion in the elastomer component, and also through different temperatures, which can be caused by heating elements.

The invention thus relates to a corresponding elastomer component in which the separating element is an inlaid wire, filament or hollow wire (105) which consists of a material or is surrounded by a material which is not capable of forming a strong bond to the surrounding elastomer material (3, 104) during production thereof.

The invention likewise relates to a corresponding elastomer component in which the separating element is an introduced ink, paint, plastic, paper or metal layer (107) which consists of a material or is surrounded by a material which is not capable of forming a strong bond to the surrounding elastomer material (3, 104) during production thereof. In particular, this layer (107) can be an ink, paint, paper, plastic or metal layer, film or foil, which are introduced into the elastomer body as, for example, template, matrix or metal blank by means of a very wide variety of processes known per se.

The invention furthermore relates to a corresponding elastomer component in which the separating element (4, 105, 107, 115, 116) has a one- two- or three-dimensional open or closed structure, for example a ring-shaped, spiral-shaped, meander-shaped, interrupted or continuous structure, within the elastomer (3, 104).

The invention accordingly also relates to a corresponding elastomer component in which either (i) the elastomer layer (3, 104) has a plurality of the separating elements of the same type or a plurality of units of separating elements of the same type (4, 105, 107, 115, 116), which are uniformly distributed in the elastomer component or a sub-unit of the elastomer component, so that a uniform, symmetrical pressure distribution and thus pre-stress occurs in the elastomer component or a sub-unit, or (ii) the elastomer layer (3, 104) has a plurality of the separating elements of the same type or a plurality of units of separating elements of the same type (4, 105, 107, 115, 116), which are distributed differently in the elastomer component or a sub-unit of the elastomer component, where these separating elements or units of separating elements have at least one supply line (10, 101), enabling asymmetrical pressure distributions, and thus pre-stresses, of locally different strength to be established in the component or sub-units thereof, or (iii) the elastomer layer (3, 104) has a plurality of separating elements of different types or a plurality of units of separating elements of different types (4, 105, 107, 115, 116), which are uniformly distributed in the elastomer component or a sub-unit of the elastomer component, where these separating elements or units of separating elements have at least one supply line (10, 101), enabling pressure distributions, and thus pre-stresses, of locally different strength to be established in the component.

Elastomer components in which mixed forms of the above-mentioned structures are employed are of course also conceivable.

As already mentioned, a plurality of supply lines (10, 101) having valves or closures may be necessary in a certain elastomer component, in particular if different local segments or structures are to be subjected to different pressures. The supply lines must be pressure-stable, and are generally made from materials which are suitable for this purpose.

A suitable pressure medium (5), which is also to be regarded as calibration fluid, are, in accordance with the invention, all common media which are suitable for the generation of moderate and high pressures. In particular, hydraulic fluids, such as oils, liquid plastics, polymer gels or also water, may be mentioned here. It is also possible to employ gases or in the simplest case air as pressure medium.

In a particular embodiment, the pressure medium used is a liquid polymer solution which hardens after the desired pre-stress or compression of the elastomer layer (3, 104) has become established, and thus ensures a fixed, no longer changeable pre-stress value in the relevant elastomer part or in a segment/region of the elastomer component. Simple, non-dynamic elastomer components of this type make sense if the same loads on the component are always to be expected, and post-calibration does not appear necessary. However, the polymer body formed or the sheath surrounding it (in the case of an elastic hollow body) may, given a corresponding choice of material, itself again represent a separating element, which enables later supplementation by subsequent introduction of further polymerizing or also non-polymerizing media. Thus, e.g., a setting process which has occurred can be countered by subsequent injection.

Polymers which can be employed for this purpose are conventional polymers/copolymers, for example based on acrylate or methacrylate. Furthermore, a curing or polymerizable one- or multicomponent casting material can be employed in the case as pressure medium or calibration fluid (5), which solidifies to an elastic or also inflexible plastic after pumping in. The introduced calibration fluid (5) preferably has, after curing, similar elastic properties to the component or elastomer layer (3, 104) itself. Homogeneity of the entire elastomer component, or of the elastomer bush, is thus present, meaning that, apart from the increase in pressure, no significant influence on the component as a consequence of this is to be expected.

As already mentioned at the outset, the elastomer components according to the invention are particularly suitable if they are to have large proportions, as is often necessary, for example, on installation and use in wind turbines.

In particular, round or elliptical elastomer components which have an average diameter of greater than 30 cm, preferably greater than 50 cm, in particular greater than 100 cm and very particularly greater than 200 cm, are employed here.

The elastomer material here is generally connected to or provided with at least one, but preferably two or more plates or shells, in the form of terminal or intermediate plates or shells (1, 2, 117, 118, 110-113).

The invention thus relates, in particular, to cylindrical or conically shaped elastomeric bushes or half-bushes and elastomeric, planar layer springs or other shaped elastomer bearings, which can have a plurality of intermediate plates or metal sheets and are known per se in the prior art (e.g. EP 1 046 832 B1, EP 1 887 248 A1), but now have the elastomer components according to the invention provided with separating elements.

The invention relates, in particular, to a corresponding elastomer component in the form of a bush, half-bush or bush segment provided with the separating elements outlined, characterized in that it has terminal plates (1, 2, 117, 118) which have the geometry of cylindrical (112,113) or conically shaped (110, 111) shells, half-shells or of correspondingly shaped segments of these shells or half-shells.

In a particular embodiment of the bush according to the invention, this has at least one correspondingly dimensioned and shaped recess, into which the missing bush segment, which includes the separating element, fits precisely and is inserted firmly, where elastomer regions of the bush and bush segment are at least partly in direct contact for pressure transmission. A construction of this type is advantageous since bush segments having separating elements as described can be produced more easily than entire bushes having the corresponding separating elements. If desired, the segment having the separating elements can also be designed in an exchangeable manner, enabling one and the same bush in the installed state to be provided with separating elements of different design and thus action through the use of segments.

The invention furthermore relates to a corresponding elastomer component in which the terminal plates are in the form of discs (117, 118) and are constructed in such a way that they can be connected to machine or generator parts, and the elastomer layer (3, 104) bears the discs against one another in an elastic manner.

The full or half-bushes as well as the other elastomer elements are preferably provided with a central, preferably round opening for the accommodation of the part to be damped or the parts to be damped. The terminal or intermediate plates or shells consisting of non-elastic material consist of non-elastic material, for example steel. This material is firmly bonded to the elastomer material.

In general, conventional elastomer bushes and bearings comprise natural rubber, which can be firmly connected to the metallic bush material by vulcanization. However, since inordinately large bushes can only be hot-vulcanized with very great effort, materials which are castable in the uncured state and are elastic in the solid state, preferably synthetic or semi-synthetic materials, are employed for correspondingly large bushes according to the invention.

Such materials are known. Suitable materials for the elastomer components according to the invention and of these in particular for large elastomer bushes and bearings are, besides natural rubber, elastic polymers based on polyurethane (PU), which can be built up from identical or different polyols and polyisocyanates and have different properties with respect to castability, elasticity and stability in accordance with their composition and the components used. Elastic polymers based on PU are adequately known, as are their preparation and their properties.

In accordance with the invention, however, other elastic materials can also be used for the elastomer components according to the invention, in particular bushes, such as, for example, the following pasty/liquid multicomponent systems: unsaturated polyester resins and curing agents, epoxide/PU systems, polymer/silicone systems, polysulphide/polymer systems, two-component acrylate systems and other two- or multicomponent systems.

The corresponding material which is intended to form the elastomer layer (3, 104) is, in accordance with the invention, poured in between the outer shell (1) and the inner shell (2), which are concentric in one another, of a bush which is conventional per se. Before the material is introduced, one or more separating elements, as described above, for example a wire (105) or an elastic tube (4), is laid, for example circumferentially in the center, between outer shell (117) and inner shell (118) before the pouring of the elastomer material.

Alternatively, it is possible for the material for the elastomer layer (3, 104) to be poured in part, i.e. in portions, into the interspace formed by the shells or plates (1) and (2) with one another, and allowed to cure, and, for example, the wire (105) or tube (4) then to be laid on this cured material in such a way that it preferably has no contact with the walls of the shells/outer plates (1,2). A second elastomer layer (3, 104) is then produced. Further layers which comprise separating elements (4, 105, 107, 115, 116) can thus optionally be provided. A novel elastomer bush or elastomeric layer spring is thus provided.

The invention therefore also relates to an elastomer bush comprising at least one cylindrical, solid, non-elastic outer shell (113), at least one cylindrical, solid, non-elastic inner shell (112) which has a smaller average diameter than the outer shell, and at least one elastomer layer (3, 104) which completely fills the interspace between the cylindrical shells and is firmly bonded thereto, where the interspace between the two shells has at least one corresponding separating element (4, 105, 107, 115, 116) distributed in a circumferential or locally symmetrical or asymmetrical manner and/or arranged in one- two- or three-dimensional structures. In bushes or flat layer springs in which relatively narrow elastomer layers are to be employed, a completely or only partly circumferential wire (105) or tube (4) is preferably used.

The wire or elastic tube may be run out of the component radially or also axially at one or more points. Pressure/calibration medium (5) is forced under high pressure (5-500 bar, preferably 10-100 bar), for example from a storage vessel (8) via a pump (7) into the separating element (elastic hollow body) or between separating element and adjacent surrounding elastomer layer (3, 104) over these end pieces or alternatively directly if the latter are not provided, via the pressure-stable supply line (101, 10), which optionally includes the connector (6). In the case of the use of an elastic hollow body (4) (e.g. tube) in the component, this expands in accordance with its size and the pressure of its filling and thereby displaces the compressible elastomer layer (3, 104) until pre-compression or pre-stressing of the elastomer layer or elastomer bush corresponding to the requirements has been achieved.

The same is achieved on use of a wire or hollow wire (105), or a layer (107), e.g. a film, an ink print, etc., but here, as already outlined, the pressure medium (5) is forced into the interspaces forming due to the pressure and expanding between separating element (105, 107, 115, 116) and surrounding elastomer material (3, 104).

As already explained, the elastomer components according to the invention can be produced in basically two different ways.

The method that is simpler in practice and can thus be made less expensive is based on the creation or production of individual elastomer layers (3, 104) from the above-mentioned rubber or polymer materials, to which, after solidification thereof, the separating elements are applied or attached in the desired distribution and structure, and provided with the requisite supply lines (101). A further elastomer layer which covers or encompasses the introduced separating elements (4, 105, 107, 115, 116), so that they are completely surrounded by elastomer material, is subsequently applied.

The invention thus relates to a process for the production of a pre-stressed elastomer component as described, comprising the following steps:

(i) provision of a first, solid elastomer layer as part-layer of the entire elastomer component in the desired shape and size, (ii) attachment of one or more separating elements (4, 105, 107, 115, 116) to a surface of the provided elastomer layer after step (i), including at least one pressure-stable supply line (10, 101) in or on the separating element, if necessary with the aid of assistants which simplify the attachment and positioning on the elastomer layer, (iii) application of a second elastomer layer in the form of a still not fully cured or polymerized elastomer composition to the surface of the first, solid elastomer layer having separating elements, so that, after curing or polymerization of the elastomer composition, the latter forms a strong bond to the first elastomer layer and thus ultimately forms the elastomer layer (3, 104), but where the introduced separating elements do not form a bond to the elastomer composition on curing thereof owing to their material property, (iv) repetition of steps (ii) and (iii) in the case where a plurality of planes of separating elements in the form of a plurality of part-layers are desired in the elastomer layer (3, 104), and (v) feeding-in of the pressure medium via the supply line (10, 101) under pressure into the region between separating element and surrounding elastomer layer or into the separating element itself, where the latter compresses and the elastomer component thereby receives a pre-stress.

The full or half-bushes according to the invention can be produced in a very simple manner, as described above, using these processes.

The second process alternatively consists in the preparation of the elastomer (3, 104) in a single step. To this end, the separating element must be introduced between the terminal plates, for example of a bush, by appropriate auxiliary devices and fixed.

The invention thus also relates to a process for the production of a pre-stressed elastomer component which has at least one cylindrical, conical or flat, solid, non-elastic outer shell or plate, at least one cylindrical, conical or flat solid, non-elastic inner shell or plate, and at least one elastomer layer (3, 104) which completely fills the interspace between the correspondingly shaped shells or plates and is firmly bonded thereto, where the process has or comprises the following steps:

(i) laying or fixing at least one separating element, for example a circumferential elastic tube (4) or a wire (105), into the interspace of the two shells of the elastomer component before introduction of the elastomer layer, where the separating element is fitted at least with a supply line (10, 101) to which a calibration system, preferably comprising a calibration pump (7) with a calibration filling (8), is connected, (ii) introduction of the elastomer by filling-in of a viscous or liquid elastomer composition which, after polymerization, forms the elastomer layer (3, 104) into the interspace formed by the shells or plates (1) and (2), in which the separating element, for example the wire or tube, is located, and (iii) supply of a viscous or liquid calibration fluid or pressure medium (5) into or around the separating element under pressure, optionally via a connector (6), after the surrounding elastomer layer (3, 104) has solidified, causing the latter to be compressed and pre-stressed.

Through the supply of further pressure medium or calibration fluid (5) under pressure by means of the calibration device described (pump, line, optionally connectors), a higher pre-stress or compression of the elastomer layer (3, 104) between the shells or plates of the component or the bush can be achieved.

On use of non-polymerizable hydraulic fluids or gases, the pre-stress of the elastomer (3, 104) can, in accordance with the invention, be reduced by the discharge or removal/release of pressure or calibration fluid (5) from the relevant expanded regions/elastic hollow bodies, for example from the tube (4) or from the chambers or cavities (105) formed.

The supply of pressure medium (5) into the separating elements (107) (elastic hollow body, e.g. tube (4)) or into the regions (cavities) around the separating elements (layers, plates, ink prints, films, etc.) via the supply line (101) can be carried out in various ways.

In principle, the pressure or calibration medium (5) can be supplied axially or radially. Depending on the construction and design of the elastomer component (bush, layer spring, etc.), the supply can take place through the outer plates (1, 2, 117, 118, 110-113), e.g. a bush, as described above, towards the outside or also through the free elastomer layer surface (11) of the relevant component towards the outside. The supply line (10, 101) is generally connected to the respective volume to be filled (chambers, hollow bodies) via a connector (6). The supply line is itself in turn connected, for example via a connecting piece, to a calibration unit (pump, storage volume for the pressure medium (5), optionally high-pressure lines, etc.). One or more supply lines and connectors can be employed in a separating element, where the supply lines have pressure valves or other pressure-tight closures.

In a particular and preferred embodiment of the invention directed to elastomer bushes, the supply lines (10, 101) and connecting elements (6) are run perpendicularly through the cylinder wall of the outer shell (113) and/or inner shell (112) of the bush towards the outside or inside. The shells here have correspondingly oriented holes which accommodate the supply lines and/or the connectors (6) with an accurate fit. If the separating elements used are tubes (4) which are laid radially into the bush cross section, the tube ends can be directed to the outside or inside and connected directly to the supply lines and the pressure-medium system via the connectors. This enables greater flexibility to be achieved in the production or calibration of the elastomer components, in particular elastomer bushes.

The elastomer components according to the invention are, as already explained in the introduction, extremely suitable for the production of large to very large elastomer bushes, layer springs and other corresponding bearings (diameter >100 cm), as used in wind turbines or plants with similar dimensions/requirements.

The novel principle described above that elastomers, through the introduction of separating elements which define potential cavities which can be filled by hydraulic or other pressure media and expanded in a variable manner, so that the elastomer experiences compression and thus pre-stressing, can be used not only for the production and use of elastomeric bushes and bearings conventional per se for large plants, as described above, but also for the production and use of elastomeric shapes, arrangements or devices in which a certain controllable flexible and modifiable compression/decompression behavior of the relevant local elastomer layer relative to other regions of the elastomeric shape, arrangement or device is to be effected in different local regions, so that intentional deformations or artificial movement activities, which can be utilized industrially in a useful manner, are thereby facilitated.

In these elastomeric arrangements according to the invention, the division, design and supply of the separating elements (4, 105, 107, 115, 116) with pressure media (5) is carried out in a very differentiated and individual manner. The use of elastomeric material of different stiffness and/or different coefficients of expansion in the individual regions of the arrangement, in particular in the region of the separating elements, can likewise achieve a further fine adjustment of the flexibility of the pre-stressing behaviour of the elastomer material in certain desired region of the arrangement.

The highly variable, different compression and decompression behavior made possible by this in individual elastomer elements or regions in an arrangement of elastomer components having separating elements can be matched to one another in strength, direction and time by an intelligent computer-controlled logic in such a way that deformation or movement processes of the elastomer shape arise, which can be utilized industrially, for example for mechanical gripping, pressing, pushing, triggering, etc. The elastomeric arrangement here can be brought closer to this aim by a corresponding shaping of even individual elements of the arrangement. One possible design can thus be a mechanical gripper or even an artificial hand.

The invention thus relates to an elastomeric arrangement, optionally having a shape and design, for carrying out artificial movements or intentional deformations, comprising one or more optionally shaped elastomer elements, as described above, which are functionally connected to one another, and have intelligent computer-supported electronics, which specifically control the individual structures in the separating elements of the elements and ensure dynamic pressure distribution and thus variable expansion or compression/decompression in the locally different regions of the relevant elastomer layer(s), so that a specific deformation or movement of individual elements of the arrangement or of the entire arrangement can be carried out with the aid of the control due to the different compression/decompression of the elastomer material relative to one another in the region of the separating elements addressed in each case.

DESCRIPTION OF THE REFERENCE SYMBOLS IN THE TEXT AND FIGURES (1), (117) upper terminal plate
(2), (118) inner terminal plate (3), (104) elastomer layer
(4) elastomeric tube as separating element
(5) pressure calibration medium
(6) connector
(7), (8) pump with pressure medium
(9) decompression space
(10), (101) pressure line/filling tube
(102) valve, closure device
(11) free elastomer surface
(110) conical inner element (bush)
(111) conical outer element (bush)
(112) cylindrical inner part/shell bush
(113) cylindrical outer part/shell bush
(105) separating element as wire, filament, cannula, hollow wire
(107) separating element as layer (ink print, paint, plate, film)
(106), (108), (114) cavity or chamber after filling with pressure medium
(115) separating element as layer in channel structure (ink print, paint, metal blank
(116) three-dimensional grid comprising separating elements as in (105), (107) and (115)
(130) concrete foundation
(131) steel ring for mounting of a structure, for example a tower
(132) circumferential flange with elastomer components according to the invention

DESCRIPTION OF THE FIGURES

FIGS. 18a and 18b: Wind turbine foundation with elastomer components according to the invention

DETAILED DESCRIPTION OF THE PREFERRED EMBODIMENTS

The invention is described in greater detail in the following examples, which are directed to the figures. The parameters and values given here or also in the figures are purely illustrative and are not intended to restrict the invention, in particular if the person skilled in the art is readily able to make generalizations therefrom without himself having to be inventive.

Figure 1:
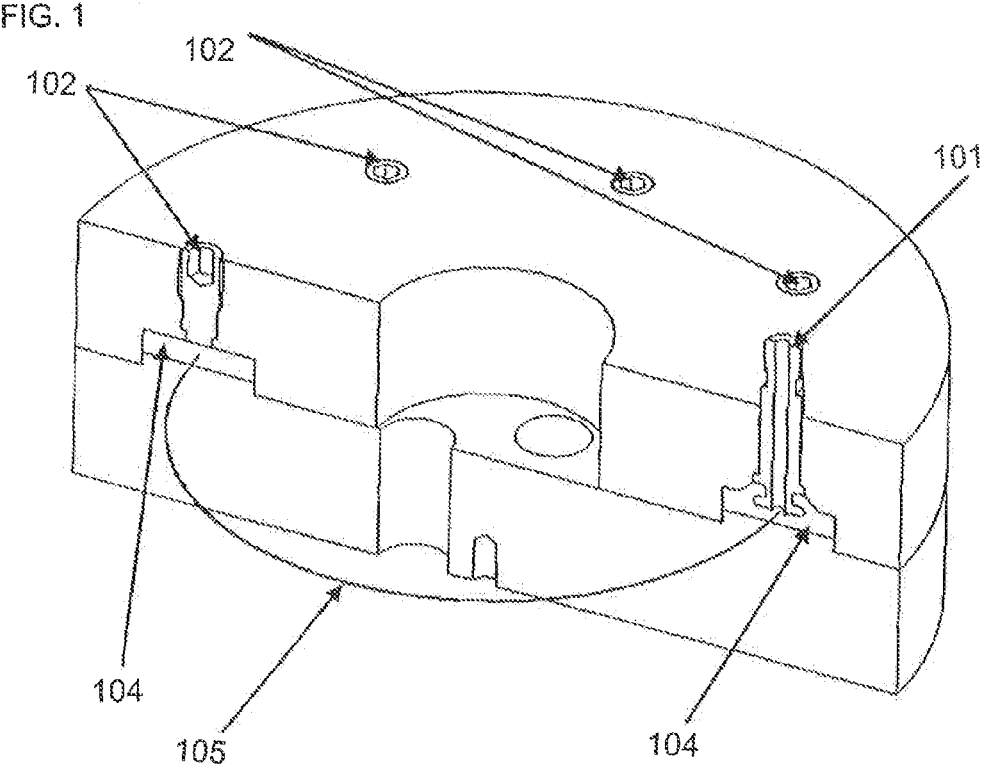
FIG. 1: Elastomeric bearing with inlaid wire, filament or the like as separating element, pressure-free (without pre-stress)
Figure 2:
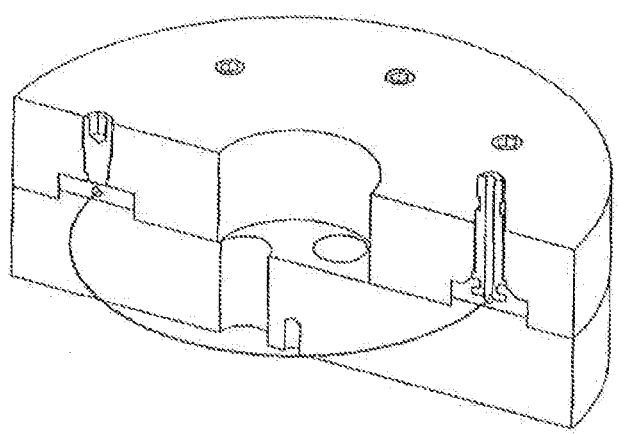
FIG. 2: Elastomeric bearing according to FIG. 1 under pressure (pre-stress)

A simple embodiment of an elastomeric bearing which includes the separating elements in the use according to the invention is depicted in FIG. 1. An elastomer layer (104) is laid as a ring into a corresponding recess of the bearing plates. A circumferential wire ring has been vulcanized centrally in the interior of the elastomer ring. The supply line (101) including valve (102) is in direct contact with the wire (105), which functions as separating element here. The valves (102) serve to decompress components pre-stressed with polymerized pressure fluid if necessary. If no pressure medium has been fed in, the elastomer layer (104) lies against the wire. On introduction of pressure medium, a ring-shaped cavity filled with pressure medium forms around the wire (FIG. 2). Since the elastomer material is clamped firmly between the plates, it is compressed and receives a corresponding pre-stress.

Figure 3:
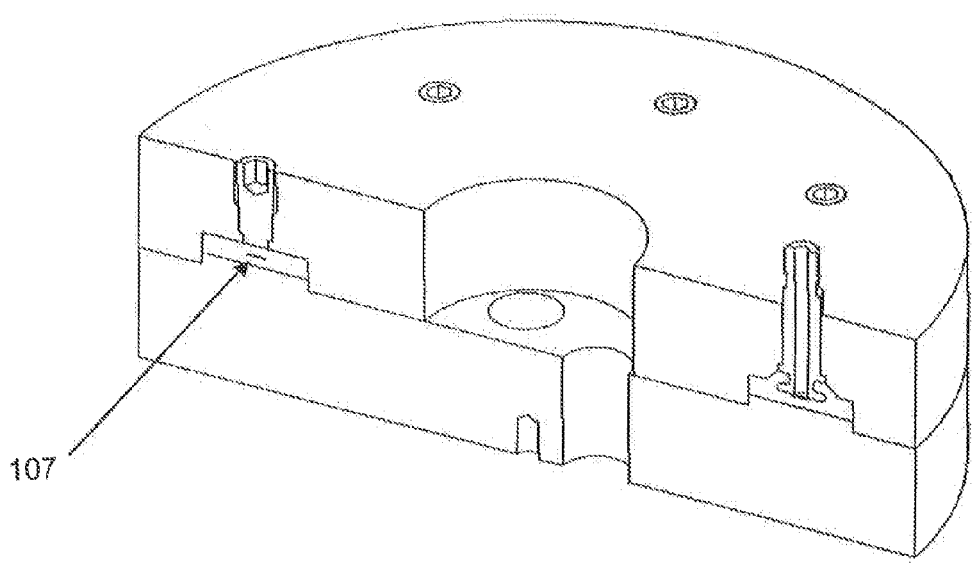
FIG. 3: Elastomeric bearing comprising a layer as separating element, pressure-free.
Figure 4:
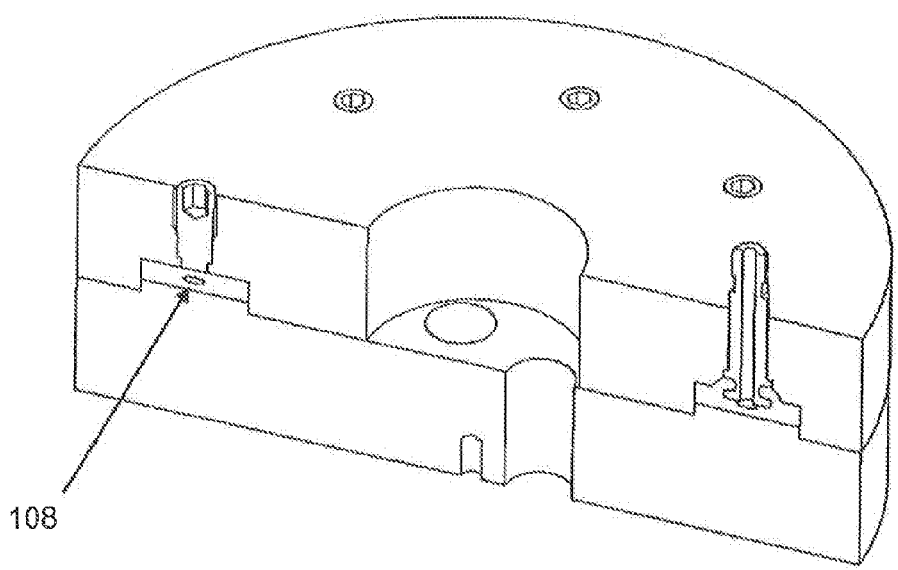
FIG. 4: Elastomeric bearing according to FIG. 3, under pressure (pre-stress)

The situation is similar if a ring-shaped layer (107) comprising ink, paint, film, metal blank, etc., is present in the interior of the elastomer body instead of the wire (FIGS. 3 and 4).

Figure 5:
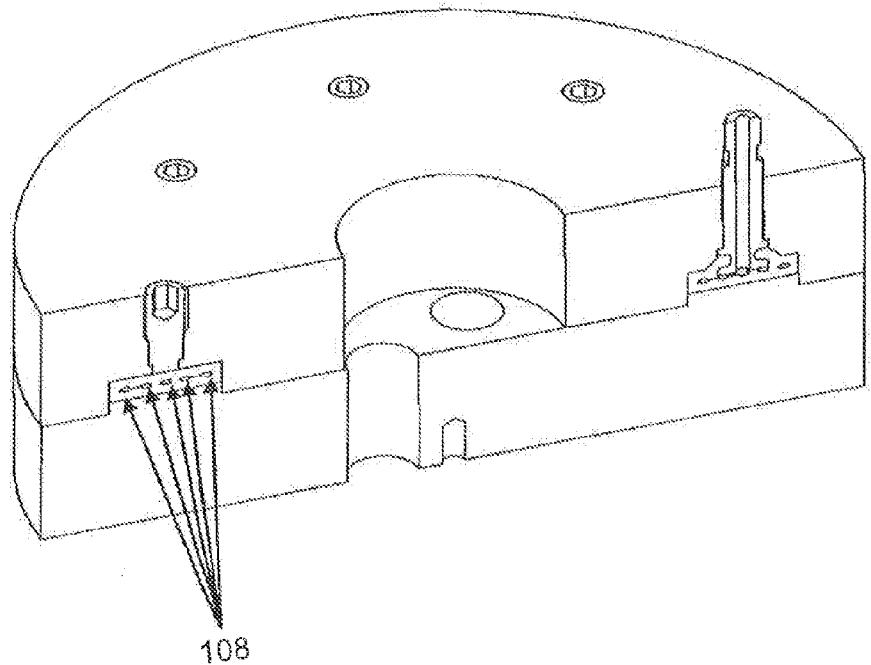
FIG. 5: Elastomeric bearing according to FIGS. 2, 3 which has circumferential layers as separating elements.
Figure 6:
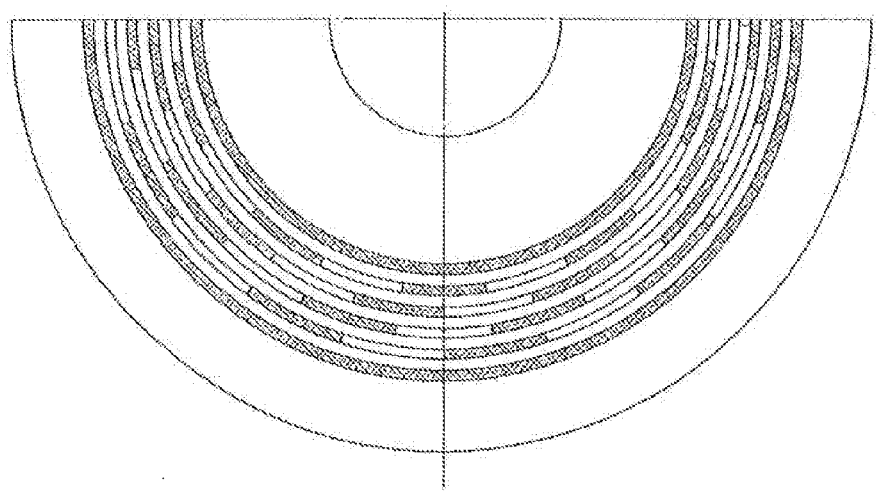
FIG. 6: Elastomeric bearing according to FIGS. 2, 3 which has circumferential layers comprising separating elements which are arranged in a meander shape (in different planes of the elastomer).

In order to obtain a more uniform and or greater pre-stress, it is also possible for a plurality of wire, tube or layer rings as separating elements to be arranged in the same or different planes/at the same or different heights in the interior of the elastomer (FIG. 5 and FIG. 6).

Figure 7:
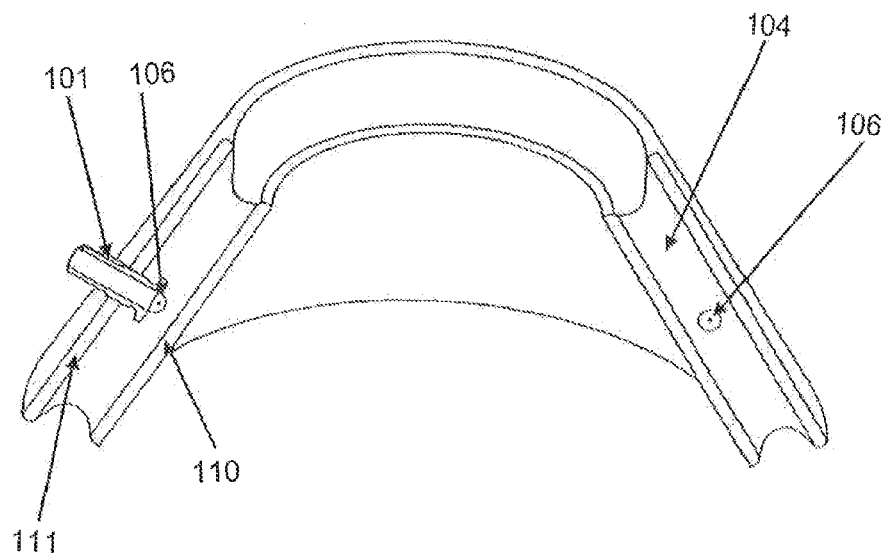
FIG. 7: Conical elastomer bearing (bush), with separating element (wire) which is tensioned by filling pressure.
Figure 8:
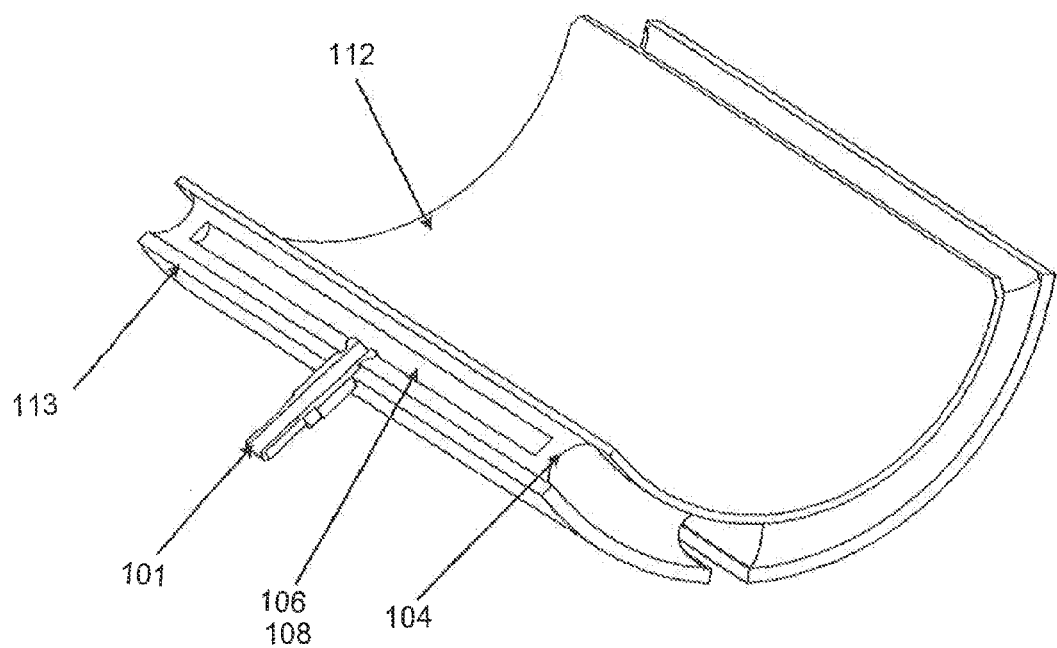
FIG. 8: Cylindrical elastomer bush with separating element (elastic hollow body/tube/plate)

FIGS. 7 and 8 show the principle according to the invention of elastomer layers which can be compressed and/or decompressed by separating elements with reference to conical or cylindrical bushes or bearings. It can be seen that the separating elements (105, 107) can be arranged both radially (FIG. 7) and axially (FIG. 8). In the bushes depicted, the supply line (101) is in each case run through the limiting outer plate. Injection of the pressure medium (5) gives rise to filled cavities (106, 108), which ensure displacement of the surrounding elastomer material.

Figure 9:
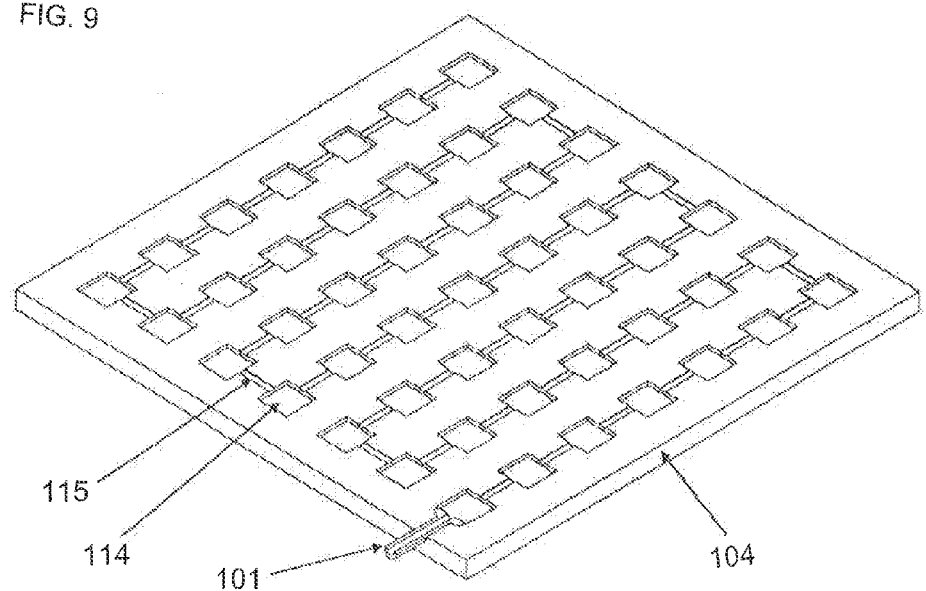
FIG. 9: Elastomer component with uniformly distributed square/rectangular separating elements generated by color printing which are connected to one another by corresponding channel structures.

FIG. 9 depicted an elastomer layer (104), on which regular layer structures, for example comprising ink, paint or other materials, are arranged. In the specific case, the structures have been produced by colour printing. This enables the entire surface to be subjected to pressure approximately uniformly. The small channel structures (115) present, which connect the surface structures (107) to one another, likewise enable hydraulic fluid or gas to flow after compression of the surrounding elastomer material. The entire structure has a supply line (101) merely at one point, meaning that the pressure medium can only reach the other separating elements (107) or chambers (114) via the channels forming. This generates damping which can be adjusted as desired, is material-dependent and can be increased in action virtually as desired. An elastomer element of this type can be designed, for example, as damping mat or as shock absorber and can function correspondingly.

The structures may also be arranged irregularly in the elastomer mat or in a correspondingly shaped elastomer part (not depicted), enabling non-uniform pressure distributions. A locally non-uniform force or deformation thus arises in the elastomer body, so that the latter specifically produces movements which are dependent on the introduced pressure. With this and similar elastomeric arrangements, elastomer components can be charged with an amount of fluid which corresponds to a multiple of the volume of the actual elastomer body. Large symmetrical and asymmetrical movements of the elastomer body are thus facilitated (gripping hand)

Figure 10:
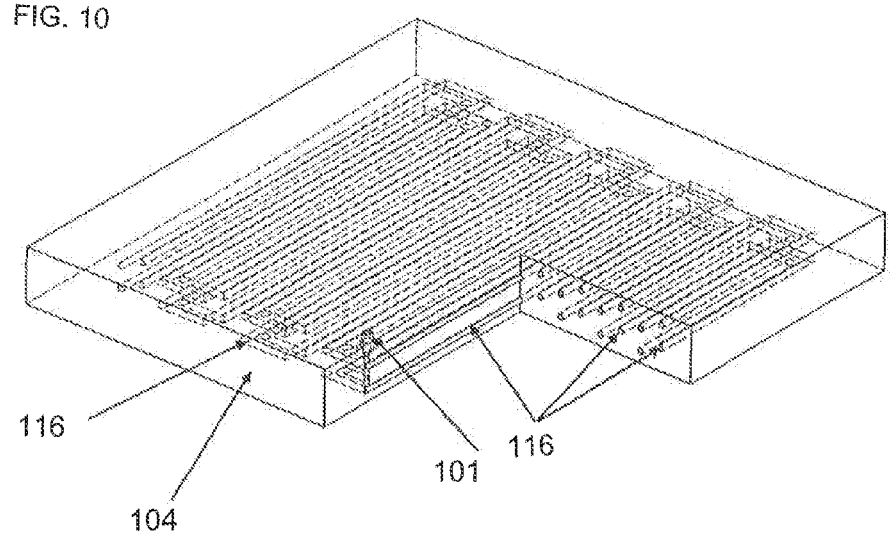
FIG. 10: Elastomer component with grid structure of separating elements (wire)

FIG. 10 shows another variant of the principle of FIG. 9. Here, a three-dimensional regular grid structure (116) likewise ensures that an overall compression of the elastomer which corresponds to a multiple of its volume can be generated. Irregular arrangements and shapes (not depicted) also enable specific deformations and thus movements to be carried out therewith.

Figure 11:
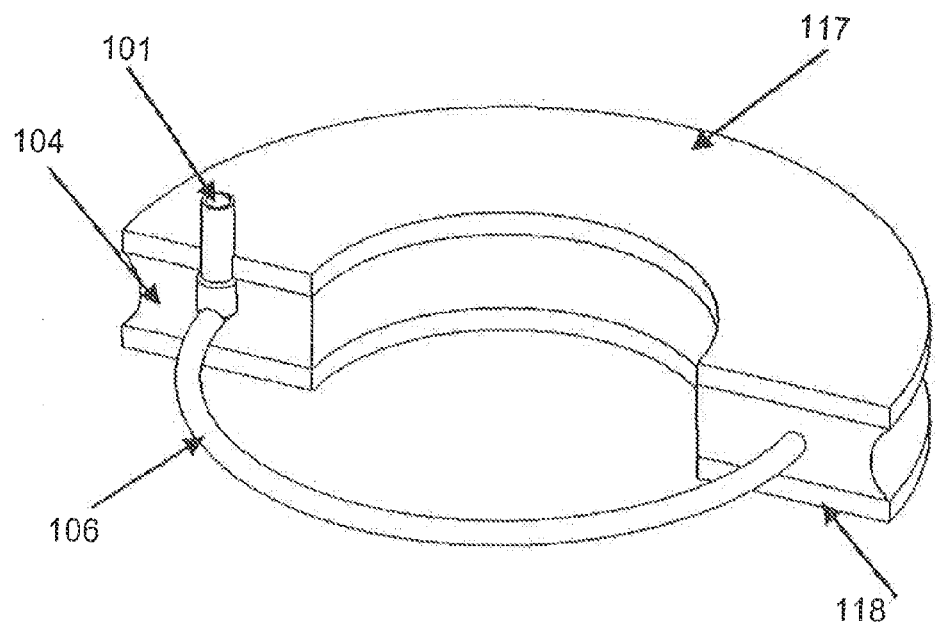
FIG. 11: Layer spring with an elastomer layer with circumferential wire or tube after introduction of pressure medium (pre-stress). The feed takes place axially from the outside through a terminal plate.
Figure 12:
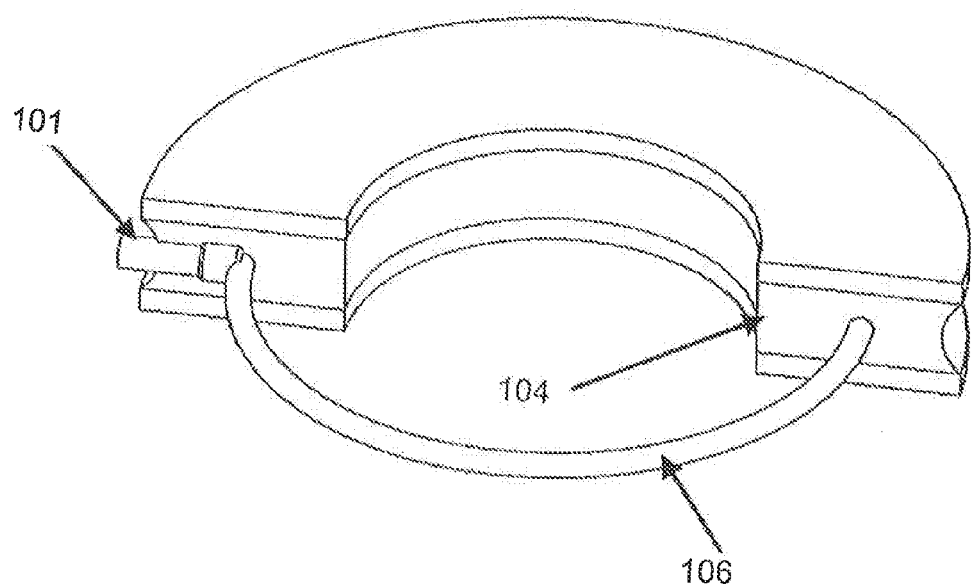
FIG. 12: Layer spring with an elastomer layer with circumferential wire or tube after introduction of pressure medium (pre-stress). The feed takes place radially towards the outside through the free elastomer layer.
Figure 13:
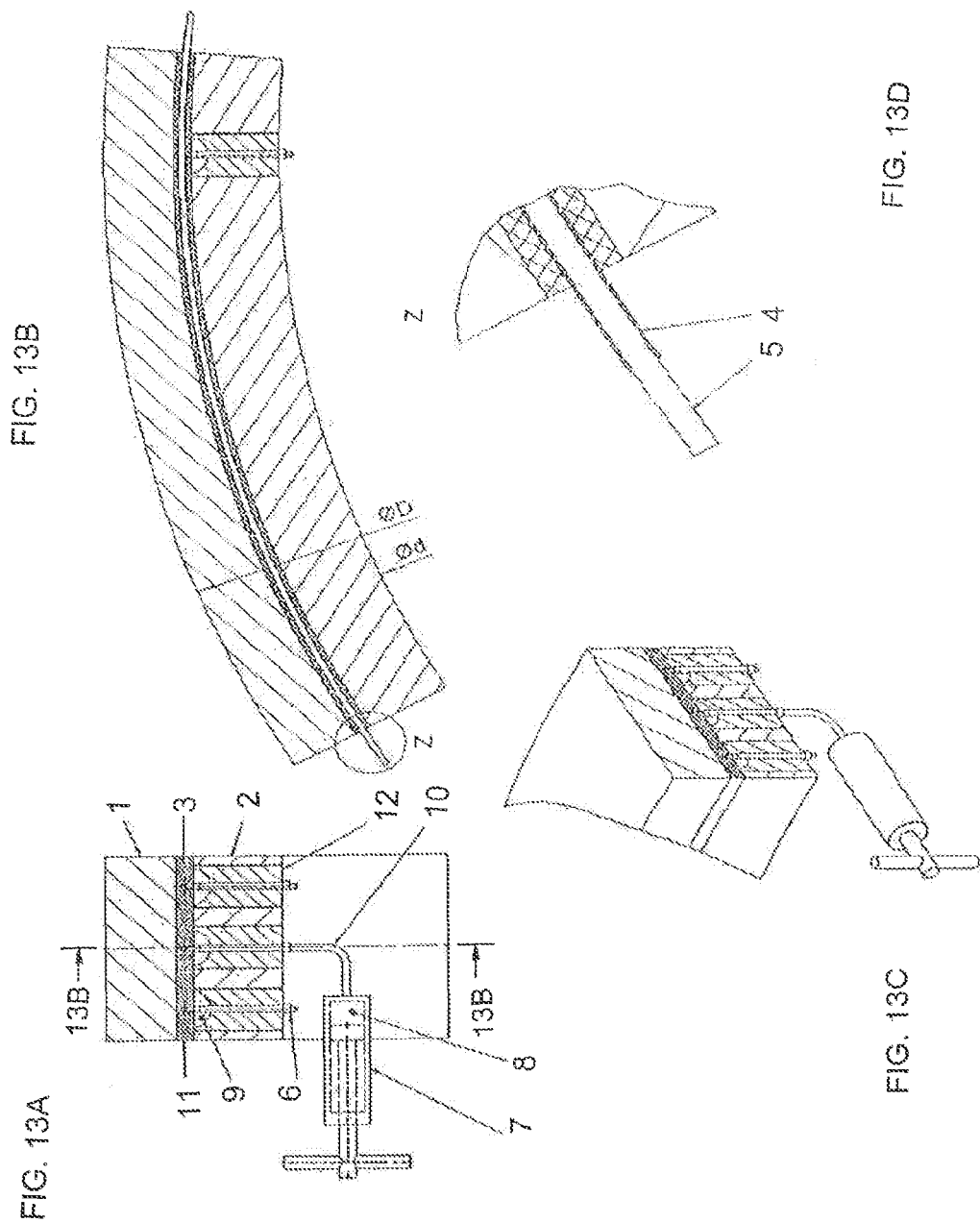
FIGS. 13a, 13b, 13c and 13d: Sections through a cylindrical elastomer bush with circumferential tube and tube ends run out of the elastomer. Also shown are connection devices and device for filling with pressure medium.
Figure 14:
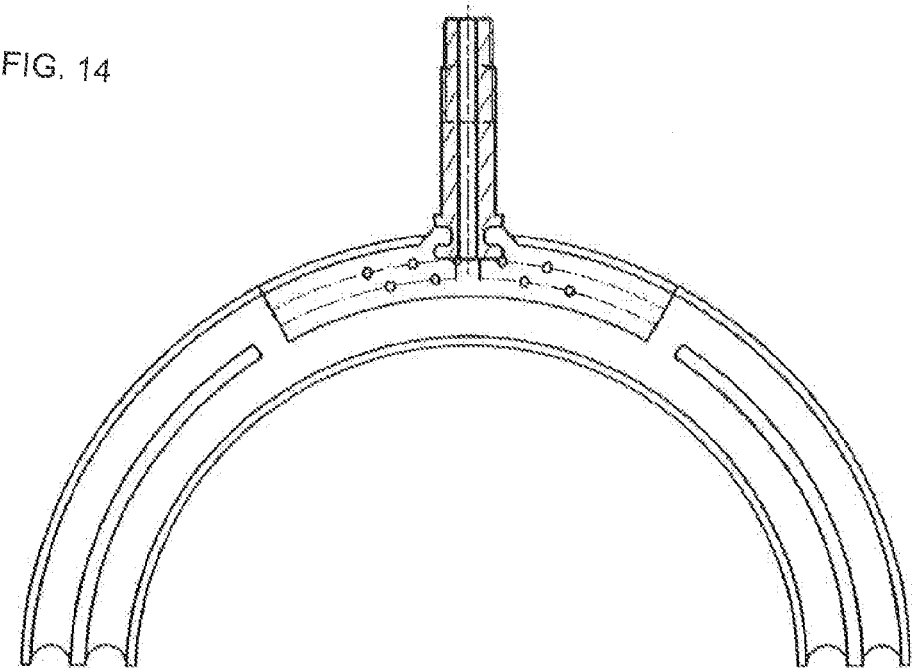
FIG. 14: Cross section through an elastomeric, cylindrical bush with inserted segment which has wire or tube as separating element and includes a supply line for the pressure medium.
Figure 15:
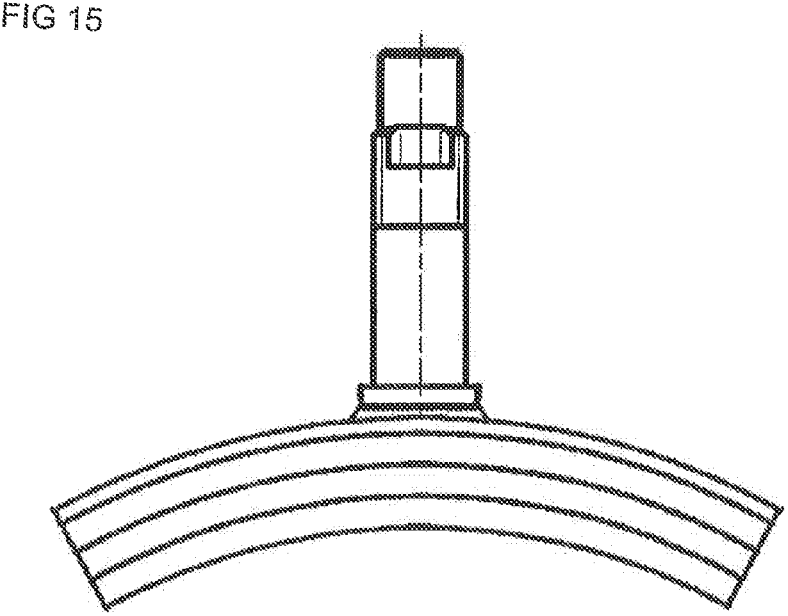
FIG. 15: Bush segment from FIG. 14 in another view.
Figure 16:
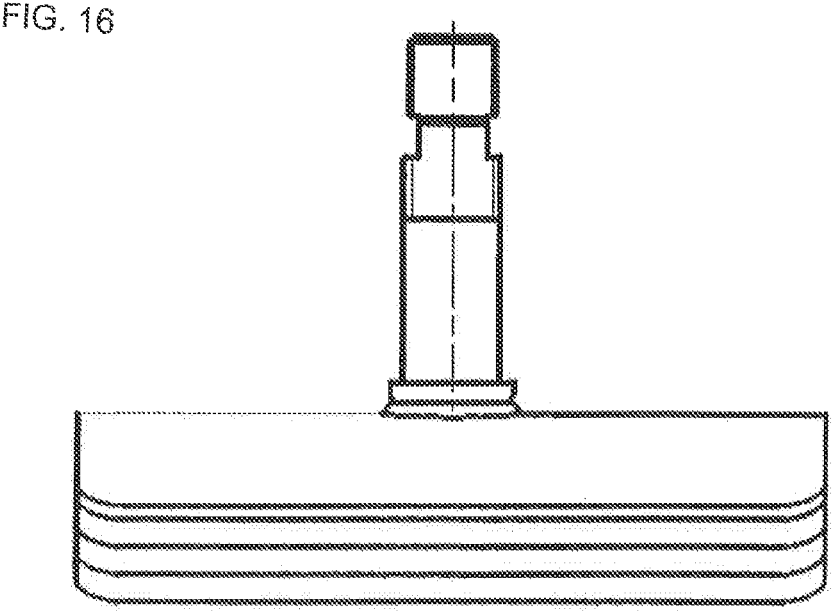
FIG. 16: Bush segment in longitudinal direction of a cylindrical bush with circumferential wires or tubes, including supply line(s), introduced at various heights of the elastomer layer.
Figure 17:
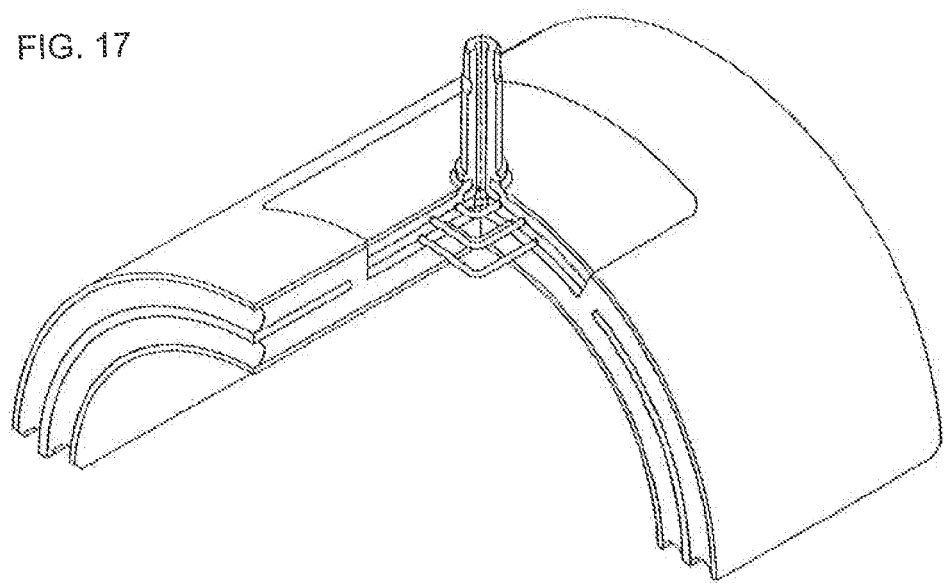
FIG. 17: 3D representation of a bush with the inserted segment of FIG. 16

FIGS. 11 and 12 apply the design principle depicted in FIGS. 1 and 2 to a layer-spring element.

FIGS. 13a, 13b, 13c and 13d use an elastic hollow body in the form of a tube (4) running around the circumference of a bush instead of layers as separating element. On use of a half-bush, the tube ends are run directly out of the elastomer and can be connected directly to the pressure-medium feed system. Alternatively, the connections may also, as depicted, be run through one or both terminal plates (1, 2).

FIGS. 14-17 show the use of an elastomeric bush segment which contains the separating elements according to the invention, by way of example as wire system. The elastomer layer of the segment is in direct contact with the layer of the remainder of the bush, so that, when pressure is transmitted through the supply line, not only the elastomer material of the segment, but also the remainder of the bush is pre-stressed. The advantage of a bush of this type lies, in particular, in the simpler production.

FIGS. 18a and 18b depict a concrete foundation (130), for example of a wind turbine, The turbine tower, which is likewise subjected to constant vibrations, is mounted on the profile steel ring (131) cast into the foundation. This ring is only loosely concreted in and preferably has circumferential flanges (132), which contain elastomer components according to the invention, at least two positions of different height. The movements of the tower loosen the concrete between the circumferential flanges (132) of the integrated ring in the absence of pre-stress. By injection of pressure media (5), an adequate pressure stress can be generated in the concrete foundation, so that the loosening of the concrete or structure is suppressed.

The invention claimed is:

1. A pre-stressable elastomer component comprising:
   first and second plates being formed as one of cylindrical shells, conical shells, cylindrical half-shells, conical half-shells, cylindrical shell segments and conical shell segments, the first and the second plates being aligned and defining a central axis such that the elastomer component is in a form of at least one of a bush, a half-bush and a bush segment;
   at least one elastomer layer that is entirely formed between the first and the second plates and radially spaced from the central axis;
   at least one separating element is completely encased by the elastomer layer in an interior thereof;
   at least one pressure-resistant supply line with a valve, the supply line with the valve passes into the elastomer layer and communicates with the at least one separating element such that, on supplying a pressure media, via the supply line with the valve, chambers form in a region of the at least one separating element due to the surrounding elastomer layer being forced apart, when the chambers are filled with the pressure media and expanded, the surrounding elastomer layer is squashed, and the elastomer component is pre-stressed, and the chambers are entirely radially spaced from the central axis.

2. The pre-stressable elastomer component according to claim 1, wherein the at least one separating element, including the supply line, is accommodated in the bush segment which is inserted into the bush, where elastomer regions of the bush and the bush segment are at least partially in direct contact with one another for pressure transmission therebetween.

3. The pre-stressable elastomer component according to claim 1, wherein the at least one separating element is surrounded by the surrounding elastomer layer and is unconnected thereto, and the chambers are formed around the at least one separating element due to an introduction of the pressure media therein, the chambers being completely delimited by the surrounding elastomer layer, the at least one separating element being spaced from the central axis, and the chambers being annular.

4. The pre-stressable elastomer component according to claim 1, wherein the first and the second plates are made from a non-elastic material, the elastomer layer is either firmly connected to or clamped between the first and the second plates, the at least one separating element is located, with respect to the central axis, centrally between the first and the second plates and is separated therefrom both radially and axially by the elastomer layer.

5. The pre-stressable elastomer component according to claim 4, wherein the first and the second plates are formed as one of the cylindrical shells, the cylindrical half-shells and the cylindrical shell segments and the supply line with the valve defines a supply axis that is normal to the central axis and supplies the pressure media, via a radially outer one of the first and the second plates, to the at least one separating element elastomer layer.

6. The pre-stressable elastomer component according to claim 1, wherein the elastomer component has at least one non-elastic interlayer which is located in the interior of the elastomer layer and is connected to elastomer material of the elastomer layer.

7. The pre-stressable elastomer component according to claim 1, wherein the at least one separating element is a deformable hollow body which has an elastic outer wall which is finable and expanded with the pressure medium via the supply line.

8. The pre-stressable elastomer component according to claim 7, wherein the deformable hollow body is an elastic tube into which the pressure medium is introduced.

9. The pre-stressable elastomer component according to claim 1, wherein the at least one separating element is one of an inlaid wire, a filament, a hollow wire which either comprises or is surrounded by a material which is unbondable with the surrounding elastomer layer during production thereof.

10. The pre-stressable elastomer component according to claim 1, wherein the at least one separating element is one of an ink layer structure, a paint layer structure, a plastic layer structure, a paper layer structure and a metal layer structure which either comprises or is surrounded by a material which prevents bonding of the separating element with the surrounding elastomer layer during production of the elastomer component.

11. The pre-stressable elastomer component according to claim 10, wherein the one of the ink layer structure, the paint layer structure, the plastic layer structure, the paper layer structure and the metal layer structure is produced by one of printing and adhesive bonding.

12. The pre-stressable elastomer component according to claim 1, wherein the at least one separating element has one of an open and a closed structure and is formed into one of a two-dimensional structure and a three-dimensional structure within the surrounding elastomer layer.

13. The pre-stressable elastomer component according to claim 12, wherein the at least one separating element has one of a ring-shaped structure, a spiral-shaped structure, an irregular structure, an interrupted structure and a continuous structure.

14. The pre-stressable elastomer component according to claim 1, wherein the pressure media is one of air, a gas, a hydraulic fluid, a viscous fluid and a polymerizable fluid.

15. The pre-stressable elastomer component according to claim 1, wherein the elastomer component has a variably adjustable pre-stress which is achieved by one of supplying the pressure media to the region of the at least one separating element, and removing the pressure media from the region of the at least one separating element, via the supply line and by opening and closing the valve.

16. The pre-stressable elastomer component according to claim 1, wherein the elastomer layer has one of a plurality of corresponding separating elements and a plurality of units of corresponding separating elements, which are uniformly distributed in either the elastomer component or a sub-unit of the elastomer component, such that a uniform, symmetrical pressure distribution, and thus pre-stressing, occurs in the elastomer component or the sub-unit of the elastomer component.

17. The pre-stressable elastomer component according to claim 1, wherein the at least one elastomer layer has one of a plurality of corresponding separating elements and a plurality of units of the corresponding separating elements, which are distributed differently in one of the elastomer component and a sub-unit of the elastomer component, where the separating elements or the units of the separating elements have noncorresponding segments of the supply line which enables asymmetrical pressure distributions, and thus pre-stressing, of locally different strength to be established in the elastomer component or the sub-unit of the elastomer component.

18. The pre-stressable elastomer component according to claim 1, wherein the elastomer layer has one of a plurality of distinctive separating elements and a plurality of units of the distinctive separating elements, which are uniformly distributed in one of the elastomer component and a sub-unit of the elastomer component, where the separating elements or the units of the separating elements have at least one segment of the supply line which enables pressure distributions, and thus pre-stressing, of locally different strength to be established in the elastomer component.

19. The pre-stressable elastomer component according to claim 1, wherein the first and the second layers of the at least one elastomer layer have at least one of different stiffness and different coefficients of expansion in the region of the at least one separating element, the at least one separating element being arranged in different arrangements to vary pre-stress in different regions of the at least one elastomer layer.

20. The pre-stressable elastomer component according to claim 17, wherein a plurality of sub-units of the elastomer component form an elastomeric arrangement for carrying out artificial movements, and are functionally connected to one another, and intelligent computer-supported electronics specifically control individual structures in the separating elements of the plurality of the sub-units of the elastomer component and ensure dynamic pressure distribution and thus variable expansion in locally different regions of the associated elastomer layers, such that dynamic deformations in the elastomeric arrangement arise and specific movement of individual elements of the elastomeric arrangement are carried out with aid of specific control due to different compression/decompression of the elastomer material relative to one another in a region of associated separating elements.

* * * * *